(12) United States Patent
Chihara

(10) Patent No.: US 12,549,810 B2
(45) Date of Patent: Feb. 10, 2026

(54) INFORMATION PROCESSING APPARATUS, CONTROL METHOD OF INFORMATION PROCESSING APPARATUS, NON-TRANSITORY COMPUTER READABLE MEDIUM, AND SYSTEM

(71) Applicant: CANON KABUSHIKI KAISHA, Tokyo (JP)

(72) Inventor: Yusuke Chihara, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 200 days.

(21) Appl. No.: 18/173,592

(22) Filed: Feb. 23, 2023

(65) Prior Publication Data

US 2023/0283844 A1 Sep. 7, 2023

(30) Foreign Application Priority Data

Mar. 7, 2022 (JP) .................... 2022-034488

(51) Int. Cl.
*H04N 21/442* (2011.01)
*G06F 3/16* (2006.01)
(Continued)

(52) U.S. Cl.
CPC ....... *H04N 21/44218* (2013.01); *G06F 3/165* (2013.01); *H04N 13/344* (2018.05); *H04N 13/383* (2018.05)

(58) Field of Classification Search
CPC ........... H04N 21/44218; H04N 13/344; H04N 13/383; H04N 21/21805; H04N 21/233;
(Continued)

(56) References Cited

U.S. PATENT DOCUMENTS

2014/0237366 A1* 8/2014 Poulos .................... G06F 3/013
  715/728
2016/0021478 A1* 1/2016 Katagiri ................. H04R 5/027
  381/26
(Continued)

FOREIGN PATENT DOCUMENTS

JP  2018-113653 A  7/2018
JP  2021-68265 A   4/2021

OTHER PUBLICATIONS

Japanese Office Action issued Oct. 14, 2025 during prosecution of Japanese Patent Application No. 2022-034488 (English-language translation included).

*Primary Examiner* — John W Miller
*Assistant Examiner* — Akshay Doshi
(74) *Attorney, Agent, or Firm* — VENABLE LLP

(57) ABSTRACT

An information processing apparatus acquires a video captured by an imaging apparatus, acquires a plurality of sounds picked up by a plurality of sound pickup apparatuses in sync with capturing of the video, acquires state information regarding an attention state of a viewer to the video, and generates audio to be reproduced with the video by combining the plurality of sounds, wherein, in a case where the state information indicates that the viewer is having an overall view of the video, a plurality of sounds picked up by a plurality of sound pickup apparatuses set inside an area being watched by the viewer in the video are combined with an equal ratio, and sounds picked up by sound pickup apparatuses set outside the area are combined with a ratio that is reduced as the distance from the area to the sound pickup apparatuses increases.

18 Claims, 9 Drawing Sheets

(51) Int. Cl.
*H04N 13/344* (2018.01)
*H04N 13/383* (2018.01)

(58) Field of Classification Search
CPC ............... H04N 21/8106; H04N 21/4223; G06F 3/165; G06F 3/167
See application file for complete search history.

(56) References Cited

U.S. PATENT DOCUMENTS

| | | | |
|---|---|---|---|
| 2017/0263236 A1* | 9/2017 | Boesen | A61F 11/08 |
| 2017/0347219 A1* | 11/2017 | McCauley | G06F 3/04815 |
| 2019/0174246 A1* | 6/2019 | De Bruijn | G06F 3/012 |
| 2021/0003817 A1* | 1/2021 | Fujiwara | G03B 13/36 |
| 2021/0049666 A1* | 2/2021 | Ahas | G06Q 30/0643 |
| 2022/0070585 A1* | 3/2022 | Chen | H04R 1/1041 |
| 2022/0303703 A1* | 9/2022 | VanBlon | H04R 3/005 |

* cited by examiner

INFORMATION PROCESSING APPARATUS, CONTROL METHOD OF INFORMATION PROCESSING APPARATUS, NON-TRANSITORY COMPUTER READABLE MEDIUM, AND SYSTEM

BACKGROUND OF THE INVENTION

Field of the Invention

The present invention relates to an information processing apparatus, a control method of the information processing apparatus, a non-transitory computer readable medium, and a system.

Description of the Related Art

Japanese Patent Application Publication No. 2021-68265 discloses a technique that allows a pseudo experience of noise in an actual site of large-scale renovation of a collective housing to be provided in a presentation. Japanese Patent Application Publication No. 2018-113653 discloses a technique for correcting the volume of collected sounds in accordance with the position of a partial image being viewed relative to a full spherical image of an underwater scenery being presented to a viewer.

However, with the techniques disclosed in Japanese Patent Application Publication No. 2021-68265 and Japanese Patent Application Publication No. 2018-113653, the sound played to the audience is always the same, which is not always enough to give a good sense of presence. According to the technique disclosed in Japanese Patent Application Publication No. 2021-68265, for example, the playback is always a previously recorded sound of hammering test or the like. According to the technique disclosed in Japanese Patent Application Publication No. 2018-113653, the volume of sound to be output is determined in accordance with the spatial position of a partial image being viewed. Therefore, if the partial image being viewed stays at the same spatial position, the same sound is played back.

SUMMARY OF THE INVENTION

The present invention provides a technique that allows a sufficient sense of presence to be imparted to viewers.

The present invention in its first aspect provides an information processing apparatus including: a processor; and a memory storing a program which, when executed by the processor, causes the information processing apparatus to: acquire a video captured by an imaging apparatus, acquire a plurality of sounds picked up by a plurality of sound pickup apparatuses in sync with capturing of the video, acquire state information regarding an attention state of a viewer to the video, generate audio to be reproduced with the video by combining the plurality of sounds, wherein, in a case where the state information indicates that the viewer is having an overall view of the video, a plurality of sounds picked up by a plurality of sound pickup apparatuses set inside an area being watched by the viewer in the video are combined with an equal ratio, and sounds picked up by sound pickup apparatuses set outside the area are combined with a ratio that is reduced as the distance from the area to the sound pickup apparatuses increases, and generate audio to be reproduced with the video by combining the plurality of sounds, wherein, in a case where the state information indicates that the viewer is paying attention to a specific object contained in the video, volumes of the sounds picked up by the sound pickup apparatuses are raised with an increment that is increased as the distance to each sound pickup apparatus from the object the viewer is paying attention to reduces.

The present invention in its second aspect provides a control method of an information processing apparatus, including: acquiring a video captured by an imaging apparatus, acquiring a plurality of sounds picked up by a plurality of sound pickup apparatuses in sync with capturing of the video, acquiring state information regarding an attention state of a viewer to the video, generating audio to be reproduced with the video by combining the plurality of sounds, wherein, in a case where the state information indicates that the viewer is having an overall view of the video, a plurality of sounds picked up by a plurality of sound pickup apparatuses set inside an area being watched by the viewer in the video are combined with an equal ratio, and sounds picked up by sound pickup apparatuses set outside the area are combined with a ratio that is reduced as the distance from the area to the sound pickup apparatuses increases, and generating audio to be reproduced with the video by combining the plurality of sounds, wherein, in a case where the state information indicates that the viewer is paying attention to a specific object contained in the video, volumes of the sounds picked up by the sound pickup apparatuses are raised with an increment that is increased as the distance to each sound pickup apparatus from the object the viewer is paying attention to reduces.

The present invention in its third aspect provides a non-transitory computer readable medium that stores a program, wherein the program causes a computer to execute a control method of an information processing apparatus, the control method including: acquiring a video captured by an imaging apparatus, acquiring a plurality of sounds picked up by a plurality of sound pickup apparatuses in sync with capturing of the video, acquiring state information regarding an attention state of a viewer to the video, generating audio to be reproduced with the video by combining the plurality of sounds, wherein, in a case where the state information indicates that the viewer is having an overall view of the video, a plurality of sounds picked up by a plurality of sound pickup apparatuses set inside an area being watched by the viewer in the video are combined with an equal ratio, and sounds picked up by sound pickup apparatuses set outside the area are combined with a ratio that is reduced as the distance from the area to the sound pickup apparatuses increases, and generating audio to be reproduced with the video by combining the plurality of sounds, wherein, in a case where the state information indicates that the viewer is paying attention to a specific object contained in the video, volumes of the sounds picked up by the sound pickup apparatuses are raised with an increment that is increased as the distance to each sound pickup apparatus from the object the viewer is paying attention to reduces.

The present invention in its fourth aspect provides a system including an imaging apparatus, a plurality of sound pickup apparatuses, and an information processing apparatus, the information processing apparatus including: a processor; and a memory storing a program which, when executed by the processor, causes the information processing apparatus to: acquire a video captured by the imaging apparatus, acquire a plurality of sounds picked up by the plurality of sound pickup apparatuses in sync with capturing of the video, acquire state information regarding an attention state of a viewer to the video, generate audio to be reproduced with the video by combining the plurality of sounds, wherein, in a case where the state information indicates that the viewer is having an overall view of the video, a plurality of sounds picked up by a plurality of sound pickup apparatuses set inside an area being watched by the viewer in the video are combined with an equal ratio, and sounds picked up by sound pickup apparatuses set outside the area are combined with a ratio that is reduced as the distance from the area to the sound pickup apparatuses increases, and generate audio to be reproduced with the video by combining the plurality of sounds, wherein, in a case where the state information indicates that the viewer is paying attention to a specific object contained in the video, volumes of the sounds picked up by the sound pickup apparatuses are raised with an increment that is increased as the distance to each sound pickup apparatus from the object the viewer is paying attention to reduces.

Further features of the present invention will become apparent from the following description of exemplary embodiments with reference to the attached drawings.

DESCRIPTION OF THE EMBODIMENTS

Figure 1A:
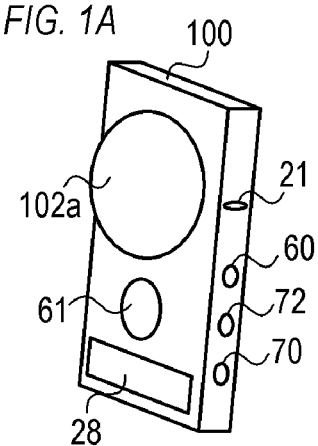
FIGS. 1A and 1B are external views of a digital camera.
Figure 1B:
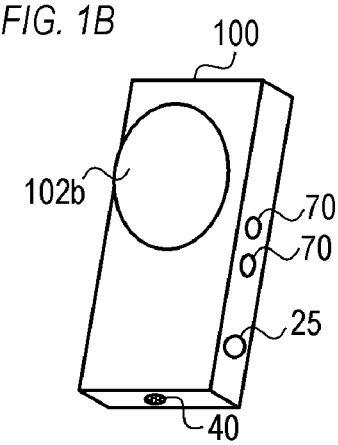

Embodiments of the present invention will be hereinafter described with reference to the drawings.
Configuration
FIG. 1A is a front perspective view (external view) of a digital camera 100 (imaging apparatus). FIG. 1B is a rear perspective view (external view) of the digital camera 100. The digital camera 100 is an omnidirectional camera (360° camera).

A barrier 102a is a protection window for a front camera section that captures the area in front of the digital camera 100. The front camera section is a wide-angle camera section having a wide range of coverage (180° or more vertically and horizontally) of the area in front of the digital camera 100, for example. A barrier 102b is a protection window for a rear camera section that captures the area behind the digital camera 100. The rear camera section is a wide-angle camera section having a wide range of coverage (180° or more vertically and horizontally) of the area behind the digital camera 100, for example.

A display unit 28 displays various pieces of information. A shutter button 61 is an operation unit (operation member) that allows imaging instructions to be input. A mode change switch 60 is an operation unit for switching from one to another of various modes. A connection I/F 25 is a connector for connecting a connection cable to the digital camera 100. The connection cable is used to connect external equipment such as a smartphone, personal computer, or television to the digital camera 100. An operation units 70 include various switches, buttons, dials, touch sensors, etc., that receive various operations by the user. A power switch 72 is a press button for switching between power on and power off.

An illumination unit 21 is a light-emitting member such as a light-emitting diode (LED), which informs the user of various states of the digital camera 100 with certain illumination patterns or colors. A fixing unit 40 is a tripod screw hole, for example, which is used to fixedly set the digital camera 100 with a fixing tool such as a tripod.

Figure 1C:
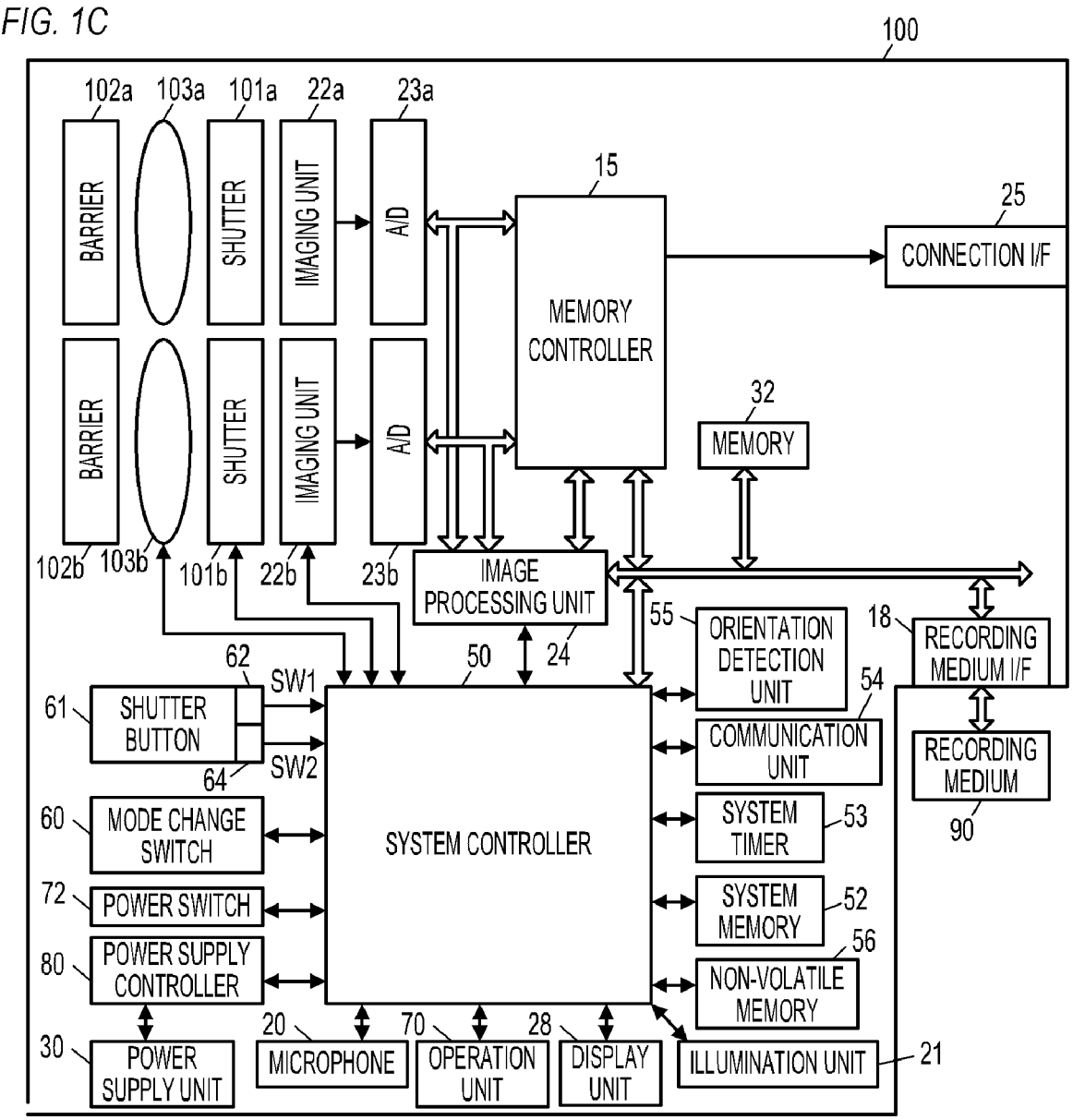
FIG. 1C is a block diagram of the digital camera.

FIG. 1C is a block diagram illustrating a configuration example of the digital camera 100.

The barrier 102a covers the imaging system of the front camera section (such as an imaging lens 103a, a shutter 101a, an imaging unit 22a, etc.) to prevent contamination or damage of the imaging system. The imaging lens 103a is a wide-angle lens made up of a group of lenses including a zoom lens and a focus lens. The shutter 101a is a shutter having a diaphragm function that adjusts the amount of light from the object into the imaging unit 22a. The imaging unit 22a is an imager (image sensor) composed of a CCD or CMOS device that converts an optical image into an electrical signal. An A/D converter 23a converts an analog signal output from the imaging unit 22a into a digital image signal. Instead of providing the barrier 102a, an outer face of the imaging lens 103a may be exposed, in which case the imaging lens 103a prevents contamination or damage of other components of the imaging system (such as the shutter 101a and imaging unit 22a).

The barrier 102b covers the imaging system of the rear camera section (such as an imaging lens 103b, a shutter 101b, an imaging unit 22b, etc.) to prevent contamination or damage of the imaging system. The imaging lens 103b is a wide-angle lens made up of a group of lenses including a zoom lens and a focus lens. The shutter 101b is a shutter having a diaphragm function that adjusts the amount of light from the object into the imaging unit 22b. The imaging unit 22b is an imager composed of a CCD or CMOS device that converts an optical image into an electrical signal. An A/D converter 23b converts an analog signal output from the imaging unit 22b into a digital image signal. Instead of providing the barrier 102b, an outer face of the imaging lens 103b may be exposed, in which case the imaging lens 103b prevents contamination or damage of other components of the imaging system (such as the shutter 101b and imaging unit 22b).

The imaging unit 22a and imaging unit 22b capture VR (Virtual Reality) images. The VR images here refer to images that can be displayed in VR (displayed in "VR view" display mode). The VR images include omnidirectional images (full spherical images) captured with an omnidirectional camera (360° camera), and panoramic images having an image range (effective image range) that is wider than the range of one image that can be displayed in the display unit. The VR images include not only still images but also videos and Live View images (images acquired from a camera almost in real time). The VR images have an image range (effective image range) covering a maximum of 360° field of view in the up and down direction (vertical angle, zenith angle, elevation angle, depression angle, altitude angle, pitch angle) and in the left and right direction (horizontal angle, azimuth angle, yaw angle).

The VR images may not necessarily provide 360° vertical coverage and/or 360° horizontal coverage and may include images having a wider angle of view (field of view) than that of images that can be captured with a normal camera, or images having an image range (effective image range) that is wider than the range of one image that can be displayed in the display unit. For example, an image captured with a 360° camera capable of imaging an object covering a field of view (angle of view) of 360° in the left and right direction (horizontal angle or azimuth angle) and 210° vertical angle from the zenith is a type of VR image. Another example of a VR image is an image captured with a camera capable of imaging an object covering a field of view (angle of view) of 180° in the left and right direction (horizontal angle or azimuth angle) and 180° vertical angle from the horizontal. In other words, images having an image range covering a field of view of more than 160° (±80°) each in the up and down direction and in the left and right direction, or images having a wider image range than the range of the visual field in humans, are all types of VR images.

The VR display (display in "VR view" display mode) of such a VR image while changing the orientation of the display apparatus (that displays the VR image) in the left or right rotating direction allows for viewing of an omnidirectional image seamlessly continuous in the left and right direction (horizontal rotating direction). In the up and down direction (vertical rotating direction), a seamless omnidirectional image can be viewed in the range of ±105° from the top (zenith). The area beyond 105° from the top will be a blank region where there is no image. A VR image can also be rephrased as an "image having an image range that forms at least part of a virtual space (VR space)."

The VR display (VR view) here refers to a display method (display mode) with a variable display area of the VR image, whereby an image of the field of view corresponding to the orientation of the display apparatus is displayed. The VR display includes a "single-eye VR display (single-eye VR view)," which deforms (corrects distortion of) an image by mapping it onto a virtual sphere to display a single VR image. The VR display also includes a "dual-eye VR display (dual-eye VR view)," which deforms a left-eye image and a right-eye image by mapping each of them onto a virtual sphere to display a left-eye VR image and a right-eye VR image side by side in left and right regions. The "dual-eye VR display" that uses a left-eye VR image and a right-eye VR image taking account of parallax allows for seeing these VR images as a 3D image. In either VR display, in the case where the user wears a head mount display (HMD) that is a display apparatus, the user views images of the field of view corresponding to the direction of the user's face. For example, let us assume that the VR image being displayed at one point is an image of the field of view with the center at 0° in the left and right direction (specified azimuth such as north) and 90° in the up and down direction (90° from the zenith, i.e., horizontal). Turning around the display apparatus 180° (e.g., changing the orientation so that the display surface faces north instead of south) changes the display area of the VR image to an image of the field of view with the center at 180° in the left and right direction (opposite azimuth, e.g., south) and 90° in the up and down direction (horizontal). In the case of a user viewing an HMD, this means that when the user turns his/her face from north to south (i.e., turns around), the image displayed in the HMD also changes from that of the north to that of the south. Such VR display can give the user a visual feel (sense of immersion) as if s/he was there in the VR image (VR space). A smartphone mounted on VR goggles (head mounted adapter) can be considered a type of HMD.

The display method of VR images is not limited to the above. The display area may be moved (scrolled) not by a change in posture but in accordance with user's actions to a touch panel or direction button. During the VR display ("VR view" display mode), the display area may be made changeable in accordance with actions such as a touch or move on the touch panel, a drag of a mouse, or a press on a direction button, in addition to a change in posture.

An image processing unit 24 performs predetermined resizing such as pixel interpolation or size reduction, or color conversion to the data from the A/D converter 23a or A/D converter 23b, or the data from a memory controller 15. The image processing unit 24 also performs predetermined computations using the captured image data. A system controller 50 controls exposure and distance measurement based on the computation results obtained by the image processing unit 24. This is followed by AF (autofocus) processing, AE (auto exposure) processing, EF (pre-flashing) processing and so on in TTL (through the lens) mode. The image processing unit 24 further performs predetermined computations using the captured image data, and performs AWB (auto white balance) processing in TTL mode based on the obtained computation results. The image processing unit 24 also performs basic image processing to the two images (two fisheye images or wide-angle images) obtained by the A/D converter 23a and A/D converter 23b, and performs an image joining process for combining the two images prepared by the basic image processing to generate a single VR image. The image processing unit 24 also performs image cropping, enlargement, distortion correction and so on for the VR display of VR images during the VR display in Live View mode or during playback, and performs rendering to draw the processing results into the VRAM of a memory 32.

In the image joining process, the image processing unit 24 uses one of the two images as a reference and the other as an image to be compared with the reference, calculates an amount of displacement between the reference image and the compared image for each area by pattern matching, and detects positions of the joint between the two images based on the displacement amount for each area. The image processing unit 24 corrects distortion of each image by geometric conversion in consideration of the detected positions of the joint and the lens characteristics of the respective optical systems, and converts each image into a full spherical format (full spherical image format). The image processing unit 24 then combines (blends) the two full spherical format images to generate one spherical image (VR image). The full spherical image is generated using equirectangular projection, for example, i.e., the position of each pixel of the spherical image can be mapped to a coordinate on the surface of the sphere (VR space).

Output data from the A/D converters 23a and 23b is written in the memory 32 via the image processing unit 24 and memory controller 15, or via the memory controller 15 alone, bypassing the image processing unit 24. The memory 32 stores image data obtained by the imaging units 22a and 22b and converted to digital data by the A/D converters 23a and 23b, and image data to be output to an external display via the connection I/F 25. The memory 32 is equipped with a sufficient storage capacity to store a predetermined number of still images and a predetermined length of video and audio.

The memory 32 also doubles as a memory for image display (video memory). The image display data stored in the memory 32 can be output to an external display via the connection I/F 25. The VR images captured by the imaging units 22*a* and 22*b*, generated by the image processing unit 24, and stored in the memory 32 may be consecutively forwarded and shown in an external display, to realize an electronic view finder function, or Live View display (LV display). Hereinafter, images shown in the Live View display will be referred to as Live View images (LV images). The Live View display is also possible by forwarding VR images stored in the memory 32 to wirelessly connected external equipment (such as a smartphone) via a communication unit 54 and displaying the images in the external equipment (remote LV display).

A non-volatile memory 56 is a memory that is a type of electrically erasable and writable recording medium such as an EEPROM, for example. The non-volatile memory 56 records constants, programs and the like for the operation of the system controller 50. The programs here refer to computer programs for executing various processing functions.

The system controller 50 is a control unit having at least one processor or circuit and controls the entire digital camera 100. The system controller 50 executes a program recorded in the above-mentioned non-volatile memory 56 to implement the various processing functions. A system memory 52 is a RAM, for example, where the constants and variables for the operation of the system controller 50 and programs read out from the non-volatile memory 56 are deployed. The system controller 50 also performs display control by controlling the memory 32, image processing unit 24, and memory controller 15. A system timer 53 is a time counter that counts time for various control operations or measures time with a built-in clock.

The mode change switch 60, shutter button 61, operation units 70, and power switch 72 are used for inputting various operation instructions to the system controller 50.

The mode change switch 60 is for switching the operation mode of the system controller 50 to one of a still image record mode, a video shooting mode, a playback mode, a communication connection mode, and so on. The still image record mode may further include an auto-imaging mode, automatic scene-recognition mode, manual mode, aperture-priority mode (Av mode), shutter speed priority mode (Tv mode), and program AE mode. There are also various scene modes, custom mode, etc., that allow setting for individual scenes. The mode change switch 60 allows the user to directly switch to one of these modes. Alternatively, the mode change switch 60 may be used first to switch to the screen showing a list of imaging modes, after which one of the plurality of modes shown in the display unit 28 may be selected using another operation member to switch to that mode. Similarly, the video shooting mode may further include a plurality of modes.

The shutter button 61 includes a first shutter switch 62 and a second shutter switch 64. The first shutter switch 62 turns on in the middle of operation of the shutter button 61 (half-press) and generates a first shutter switch signal SW1 (instruction to be ready for imaging). Upon receiving the first shutter switch signal SW1, the system controller 50 starts actions to be ready for imaging such as AF (autofocus) processing, AE (auto exposure) processing, AWB (auto white balance) processing, EF (pre-flashing) processing and so on. The second shutter switch 64 turns on at the end of operation of the shutter button 61 (full-press) and generates a second shutter switch signal SW2. Upon receiving the second shutter switch signal SW2, the system controller 50 starts a series of actions for the imaging from reading out of signals from the imaging units 22*a* and 22*b* to writing of image data into a recording medium 90.

The shutter button 61 need not necessarily be limited to an operation member that allows the two-step operation of half-press and full-press, and may be an operation member that allows only one press down. In this case, the one press down initiates the actions to be ready for imaging and the imaging process one after another. This is the same action as when a shutter button that allows half-press and full-press is fully pressed (the first shutter switch signal SW1 and second shutter switch signal SW2 being generated almost at the same time).

A variety of function icons and options are shown in the display unit 28 to be selected, to assign the operation units 70 respective functions in each scene to serve as various function buttons. The function buttons include, for example, End button, Return button, Forward button, Jump button, Preview button, Attribute Change button, and so on. For example, when a menu button is pressed, a menu screen that allows various settings appears in the display unit 28. The user can perform setting intuitively by operating the operation units 70 while looking at the menu screen shown in the display unit 28.

A power supply controller 80 is composed of a battery detection circuit, a DC-DC converter, a switch circuit that switches the blocks to be powered, and so on, and detects the presence or absence of a battery being mounted, the type of battery, and remaining battery charge. The power supply controller 80 controls the DC-DC converter on the basis of its detection results and instructions from the system controller 50, and supplies a necessary voltage to various units including the recording medium 90 for a necessary period of time. A power supply unit 30 includes primary batteries such as alkaline or lithium batteries, secondary batteries such as NiCd, NiMH, or Li batteries, an AC adapter, and so on.

A recording medium I/F 18 is an interface for the recording medium 90 such as a memory card, hard disk, and so on. The recording medium 90 is a recording medium such as a memory card for recording captured images, and may include a semiconductor memory, an optical disc, a magnetic disc, and so on. The recording medium 90 may be a replaceable recording medium that can be attached to and removed from the digital camera 100, or may be a built-in recording medium in the digital camera 100.

The communication unit 54 sends and receives video signals and audio signals to and from external equipment connected thereto wirelessly or via a wire cable. The communication unit 54 can connect to a wireless LAN (Local Area Network) or the Internet. The communication unit 54 can send out images captured by the imaging units 22*a* and 22*b* (including LV images) or images recorded in the recording medium 90, and receive images and various pieces of information from external equipment.

An orientation detection unit 55 detects the orientation of the digital camera 100 relative to the direction of gravity. Whether an image captured by the imaging units 22*a* and 22*b* is an image taken with the digital camera 100 set horizontally or vertically can be determined based on the orientation detected by the orientation detection unit 55. The orientation detection unit can also determine how much the digital camera 100 was inclined in the directions of three axes, yaw, pitch, and roll (rotating directions) when the imaging units 22*a* and 22*b* captured an image. The system controller 50 is able to add the information on the orientation detected by the orientation detection unit 55 to the image file of the VR image captured by the imaging units 22*a* and 22*b*, and to record the image after rotating the image (adjust the orientation of the image such as to correct the inclination (zenith correction)). One of an acceleration sensor, gyro sensor, geomagnetic sensor, azimuth sensor, altitude sensor and the like or a combination of a plurality of these sensors may be used as the orientation detection unit 55. It is also possible to detect a movement of the digital camera 100 (pan, tilt, pick-up, stationary or not, etc.) using the acceleration sensor, gyro sensor, and azimuth sensor that make up the orientation detection unit 55.

A microphone 20 is a microphone that collects (picks up) sounds around the digital camera 100 to be recorded as the audio of a moving VR image (VR video). The connection I/F 25 is a connection plug for connection with external equipment via an HDMI® cable or a USB cable to send and receive images.

While the digital camera 100 has been described as an omnidirectional camera with reference to FIGS. 1A to 1C as one example, the digital camera may instead be a dual VR camera, for example, which has a dual lens unit capable of imaging a right image and a left image taking account of parallax. A dual lens unit is equipped with fisheye lenses capable of capturing an image of around 180°, one each for a right-eye optical system and a left-eye optical system. Using the dual lens unit, one image containing two image regions with parallax can be obtained from two points (optical systems), the right-eye optical system and the left-eye optical system. The VR display of the image thus obtained split into a left-eye image and a right-eye image allows the user to view a three-dimensional VR image of around 180°.

Figure 2A:
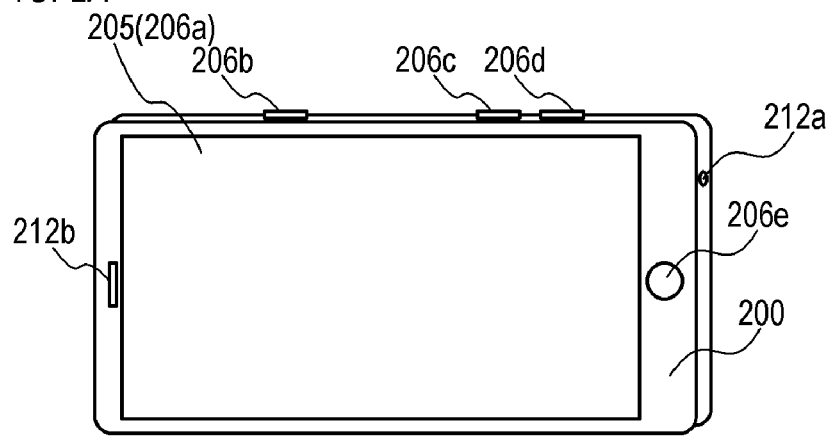
FIG. 2A is an external view of a display control apparatus.

FIG. 2A is an external view of a display control apparatus 200 that is a type of information processing apparatus. The display control apparatus 200 is a display apparatus such as a smartphone, for example. A display 205 is a display unit that displays images and various pieces of information. The display 205 is configured integrally with a touch panel 206a so that touch gestures on the display surface of the display 205 can be detected. The display control apparatus 200 is capable of displaying VR images (VR contents) on the display 205. An operation unit 206b is a power button that receives operations for switching between power on and power off of the display control apparatus 200. An operation unit 206c and an operation unit 206d are volume buttons for increasing and decreasing the volume of the sound output from a speaker 212b, an earphone or external speaker connected to an audio output terminal 212a. An operation unit 206e is a home button for displaying a home screen on the display 205. The audio output terminal 212a is an earphone jack that is a terminal for outputting audio signals to an earphone or external speaker. The speaker 212b is a built-in speaker of the main body that outputs audio.

Figure 2B:
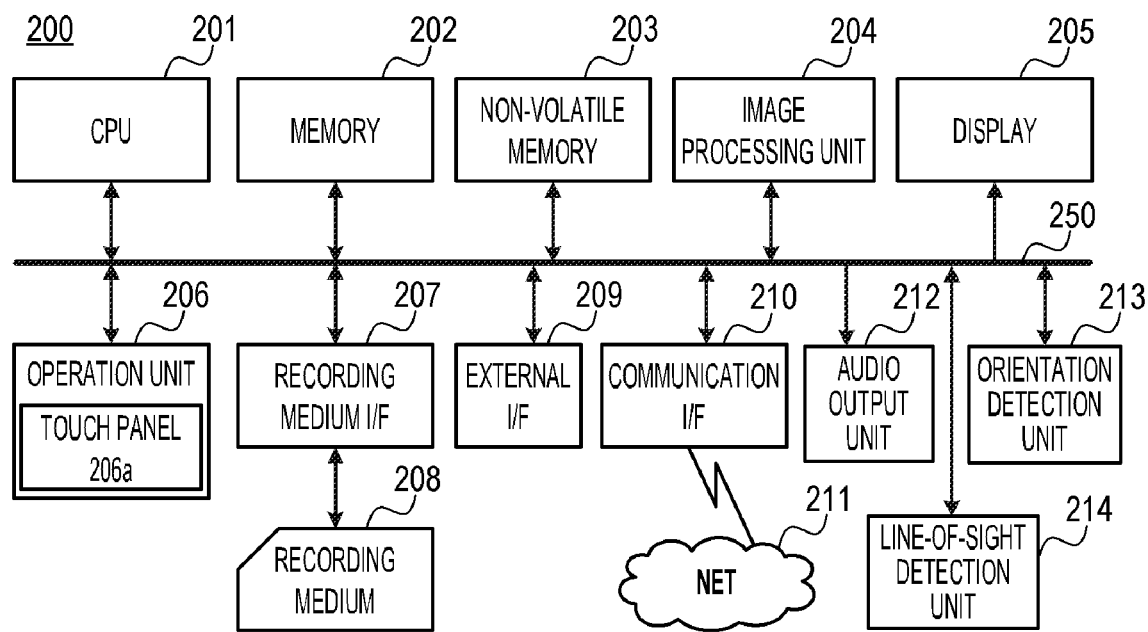
FIG. 2B is a block diagram of the display control apparatus.

FIG. 2B is a block diagram illustrating a configuration example of the display control apparatus 200. A CPU 201, a memory 202, a non-volatile memory 203, an image processing unit 204, the display 205, an operation unit 206, a recording medium I/F 207, an external I/F 209, and a communication I/F 210 are connected to an internal bus 250. An audio output unit 212 and an orientation detection unit 213 are also connected to the internal bus 250. Various parts connected to the internal bus 250 are able to exchange data with each other via the internal bus 250.

The CPU 201 is a control unit that controls the entire display control apparatus 200 and includes at least one processor or circuit. The memory 202 is a RAM (volatile memory that uses a semiconductor device), for example. The CPU 201 controls various parts of the display control apparatus 200 in accordance with a program stored in the non-volatile memory 203, for example, using the memory 202 as a work memory. The non-volatile memory 203 stores image data, audio data, other data, and various programs run by the CPU 201. The non-volatile memory 203 is a flash memory or ROM, for example.

The image processing unit 204 performs various image processing operations to the images stored in the non-volatile memory 203 or a recording medium 208, image signals acquired via the external I/F 209, and images acquired via the communication I/F 210 as controlled by the CPU 201. The image processing performed by the image processing unit 204 includes A/D conversion, D/A conversion, image data encoding, compression, decoding, enlargement/reduction (resizing), noise reduction, color conversion, and so on. The image processing further includes panoramic expansion, mapping, and conversion of VR images, which are omnidirectional images or wide-angle images covering a wide angle, if not 360°. The image processing unit 204 may be configured as a dedicated circuit block for performing a specific type of image processing. Depending on the type of image processing, the CPU 201 can also perform image processing in accordance with a program without using the image processing unit 204.

The display 205 shows images or GUI screens that provide GUI (Graphical User Interface) based on the control by the CPU 201. The CPU 201 generates display control signals in accordance with the program, and controls various parts of the display control apparatus 200 to generate video signals to be displayed on the display 205 and to output the signals to the display 205. The display 205 shows video based on the output video signals. The display control apparatus 200 may be configured to have only the interface in itself for outputting video signals to be displayed on the display 205, using an external monitor (such as a TV or HMD) as the display 205.

The operation unit 206 is an input device for receiving user operations and includes an alphanumeric input device such as a keyboard, a pointing device such as a mouse or touch panel, buttons, dials, joysticks, touch sensors, touchpads and so on. In this embodiment, the operation unit 206 includes the touch panel 206a and operation units 206b, 206c, 206d, and 206e.

The recording medium I/F 207 allows insertion and removal of the recording medium 208 such as a memory card, CD, and DVD. The recording medium I/F 207 reads out data from the mounted recording medium 208, or writes data in the recording medium 208 based on the control by the CPU 201. The recording medium 208 is a memory unit that stores data such as images to be displayed on the display 205. The external I/F 209 is an interface for input and output of video signals and audio signals (data communication) with external equipment connected thereto via a wire cable (such as USB cable) or wirelessly. The communication I/F 210 is an interface for sending and receiving various types of data such as files and commands (data communication) through communication (wireless communication) with external equipment or the Internet 211.

The audio output unit 212 outputs the audio of the video or music data reproduced in the display control apparatus 200, short tones, ringtones, and various notification sounds. While the audio output unit 212 here includes the audio output terminal 212a for connecting an earphone or the like and speaker 212b, the audio output unit 212 may also output audio data to an external speaker via wireless communication.

The orientation detection unit 213 detects the orientation of the display control apparatus 200 relative to the direction of gravity, as well as the orientation of the display control apparatus 200 relative to the yaw, roll, and pitch axes, and informs the CPU 201 of the orientation. The orientation detected by the orientation detection unit 213 provides the basis for determining whether the display control apparatus 200 is held horizontally or vertically, whether it is oriented upward or downward, or whether it is oriented diagonally. The orientation detection also allows determination of whether or not or how much the display control apparatus 200 is inclined in the rotating directions of yaw, pitch, and roll, and whether or not the display control apparatus 200 is rotated in any of these rotating directions. One of an acceleration sensor, gyro sensor, geomagnetic sensor, azimuth sensor, altitude sensor and the like or a combination of a plurality of these sensors may be used as the orientation detection unit 213.

As mentioned above, the operation unit 206 includes the touch panel 206a. The touch panel 206a is an input device configured in a planar form and laid over the display 205 to output coordinate information corresponding to the touched position. The CPU 201 can detect the following operations made to the touch panel 206a or the states of the touch panel.

- a finger or pen that was not touching the touch panel 206a newly touching the touch panel 206a, i.e., the start of a touch (hereinafter referred to as "Touch-Down")
- a finger or pen touching the touch panel 206a (hereinafter referred to as "Touch-On")
- a finger or pen touching and moving on the touch panel 206a (hereinafter referred to as "Touch-Move")
- a finger or pen that was touching the touch panel 206a being released from the touch panel 206a, i.e., the end of a touch (hereinafter referred to as "Touch-Up")
- nothing touching the touch panel 206a (hereinafter referred to as "Touch-Off")

Touch-On is detected upon detection of Touch-Down. Normally, Touch-On is continuously detected after Touch-Down unless Touch-Up is detected. Touch-On is also detected simultaneously with the detection of Touch-Move. Touch-Move is not detected even though Touch-On is being detected unless the touched position is moving. Touch-Off is detected upon detection of Touch-Up of all the fingers or pen that were touching.

These operations or states, and the coordinates of the position where a finger or pen is touching on the touch panel 206a are sent to the CPU 201, and the CPU 201 determines what operation (touch gesture) was performed on the touch panel 206a based on the sent information. In the case with Touch-Move, the moving direction of the finger or pen on the touch panel 206a can be determined from the changes in the vertical and horizontal components in position coordinates on the touch panel 206a. A Touch-Move detected over a predetermined distance or more is determined as a sliding gesture.

Moving a finger in contact with the touch panel 206a only some distance and then releasing it is called a flick. A flick in other words is a quick flicking motion on the touch panel 206a. A Touch-Move detected over a predetermined distance or more at a predetermined speed or more followed by a Touch-Up can be determined as a flick gesture (determined as a flick following a sliding gesture).

A touch gesture in which a plurality of (e.g., two) points are touched at the same time and moved together is called pinch-in, and a touch gesture in which the touch points are moved apart is called pinch-out. Pinch-in and pinch-out are collectively called pinch operation (or simply Pinch). The touch panel 206a may be any of various types of touch panels such as resistive touch panels, capacitive touch panels, surface acoustic wave touch panels, infrared touch panels, electromagnetic induction touch panels, image recognition touch panels, optical imaging touch panels, and so on. Some types of touch panels detect contact with the touch panel as a touch while others detect proximity of a finger or pen to the touch panel as a touch. Either type may be used.

A line-of-sight detection unit 214 that detects changes in the direction of user's line-of-sight (changes in gaze position) is used to detect a position of the focus of user's attention on the display surface of the display 205. The CPU 201 specifies an area (region) the user is gazing at by mapping the gaze position detected by the line-of-sight detection unit 214 with the image shown on the display 205.

Figure 2C:
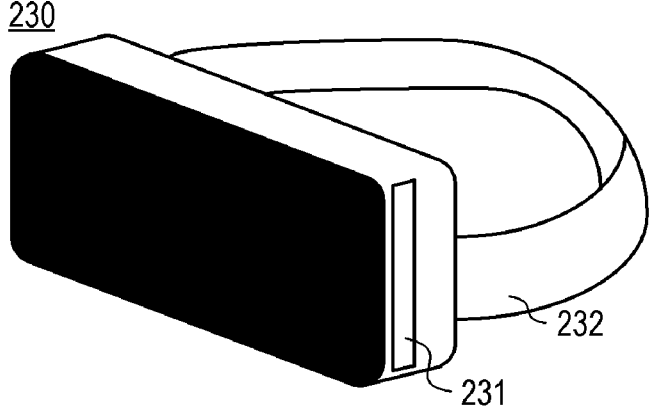
FIG. 2C is an external view of VR goggles.

FIG. 2C is an external view of VR goggles (head mounted adapter) 230 in which the display control apparatus 200 can be mounted. The display control apparatus 200 mounted in the VR goggles 230 can be used as a head mount display. An insertion port 231 is an insertion port for inserting the display control apparatus 200. The display control apparatus 200 may be entirely inserted into the VR goggles 230 with the display surface of the display 205 facing a head band 232 for fixedly attaching the VR goggles 230 on a user's head (i.e., facing the user). The user wearing the VR goggles 230 with the display control apparatus 200 mounted therein on the head can view the display 205 of the display control apparatus 200 without using a hand to hold the display control apparatus 200. In this case, the orientation of the display control apparatus 200 changes as the user moves the head or the entire body. The orientation detection unit 213 detects the change in orientation of the display control apparatus 200 and the CPU 201 performs processing in accordance with this change in orientation for the VR display. In this case, detection of the orientation of the display control apparatus 200 by the orientation detection unit 213 equals to detection of the orientation of the user's head (direction of user's line of sight). The display control apparatus 200 itself may be designed as an HMD that is head wearable without VR goggles.

Figure 3:
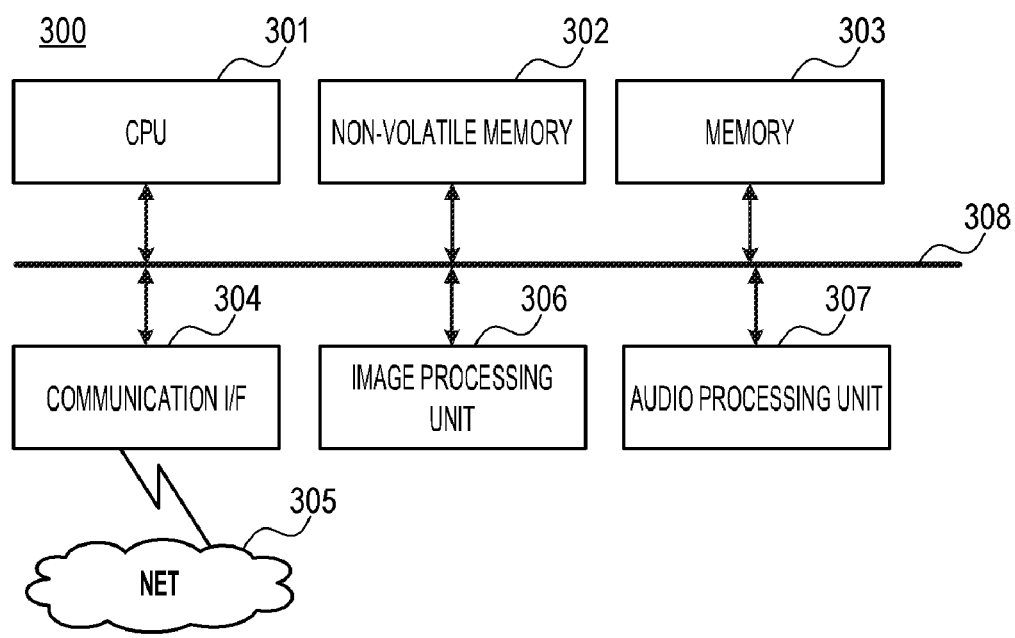
FIG. 3 is a block diagram of a delivery apparatus.

FIG. 3 is a block diagram illustrating a configuration example of a delivery apparatus 300 that is a type of information processing apparatus. The delivery apparatus 300 delivers the VR image and audio (sound) captured and picked up by the digital camera 100 to the display control apparatus 200 of the viewer. The delivery apparatus 300 combines a plurality of sounds picked up by a plurality of digital cameras 100 based on the contents of the VR image being displayed in the display control apparatus 200 and attracting the viewer's attention, and delivers the combined audio to the viewer. The plurality of sounds combined by the delivery apparatus 300 may include a sound picked up by other sound pickup apparatus than the digital camera 100 (e.g., sound pickup apparatus without an imaging unit).

A CPU 301 controls various parts of the delivery apparatus 300 in accordance with a program stored in a non-volatile memory 302, for example, using a memory 303 as a work memory. The non-volatile memory 302 stores various programs run by the CPU 301. The non-volatile memory 302 is a flash memory or ROM, for example. The memory 303 functions as a main memory of the CPU 301. The memory 303 is a RAM (volatile memory that uses a semiconductor device), for example.

A communication I/F 304 is an interface for sending and receiving data to and from the digital camera 100 or sending and receiving data to and from the display control apparatus 200 of the viewer through wireless communication or communication via a wire cable with the Internet 305 or the like. An image processing unit 306 is configured as a circuit block dedicated to image processing for the delivery of VR images. An audio processing unit 307 is configured as a circuit block dedicated to audio processing for combining a plurality of sounds. The CPU 301, non-volatile memory 302, memory 303, communication I/F 304, image processing unit 306, and audio processing unit 307 are connected to an internal bus 308. Various parts connected to the internal bus 308 are able to exchange data with each other via the internal bus 308.

Figure 4:
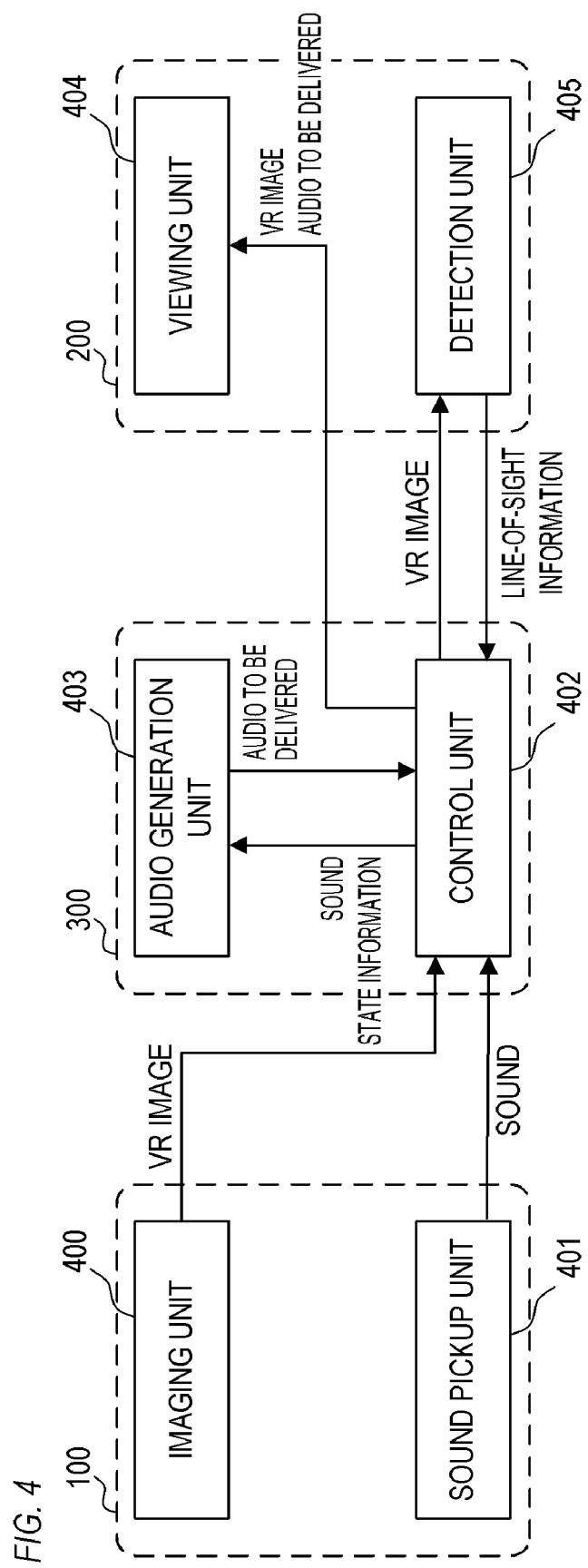
FIG. 4 is a block diagram of a system including an imaging apparatus, delivery apparatus, and display control apparatus.

FIG. 4 is a block diagram showing a configuration example of a system including an imaging apparatus, delivery apparatus, and display control apparatus. An imaging unit 400 and a sound pickup unit 401 are functional blocks of the digital camera (imaging apparatus) 100. The imaging unit 400 (imaging unit 22a and imaging unit 22b) captures VR images (videos) and sends the captured VR images to a control unit 402. The sound pickup unit 401 picks up the sounds around the location where the digital camera 100 is set in sync with the capturing of VR images and sends the picked-up sounds to the control unit 402.

The control unit 402 and an audio generation unit 403 are functional blocks of the delivery apparatus 300. The control unit 402 controls the data flow in the delivery apparatus 300. The control unit 402 also performs the process of acquiring VR images captured by the imaging unit 400 (video acquisition process), and the process of acquiring sound picked up by the sound pickup unit 401 (sound acquisition process). The control unit 402 also performs the process of acquiring state information indicating an attention state of a viewer relative to a VR image based on the line-of-sight information detected by a detection unit 405 (information acquisition process). The attention state includes a state in which the viewer is paying attention to a specific object, and a state in which the viewer is not paying attention to any object (overall view state). The audio generation unit 403 receives the sounds picked up by the sound pickup unit 401, and the state information based on the line-of-sight information detected by the detection unit 405 via the control unit 402. The audio generation unit 403 combines a plurality of sounds picked up by a plurality of sound pickup apparatuses including the digital camera 100 based on the state information and generates audio to be delivered to the viewer (to be reproduced the VR image).

A viewing unit 404 and the detection unit 405 are functional blocks of the display control apparatus 200. The viewing unit 404 presents the VR images and delivered audio input from the control unit 402 to the viewer. The detection unit 405 detects line-of-sight information of the viewer by the line-of-sight detection unit 214 and sends the line-of-sight information to the control unit 402. The detection unit 405 may generate state information based on the line of sight state and send the state information to the control unit 402.

Figure 5A:
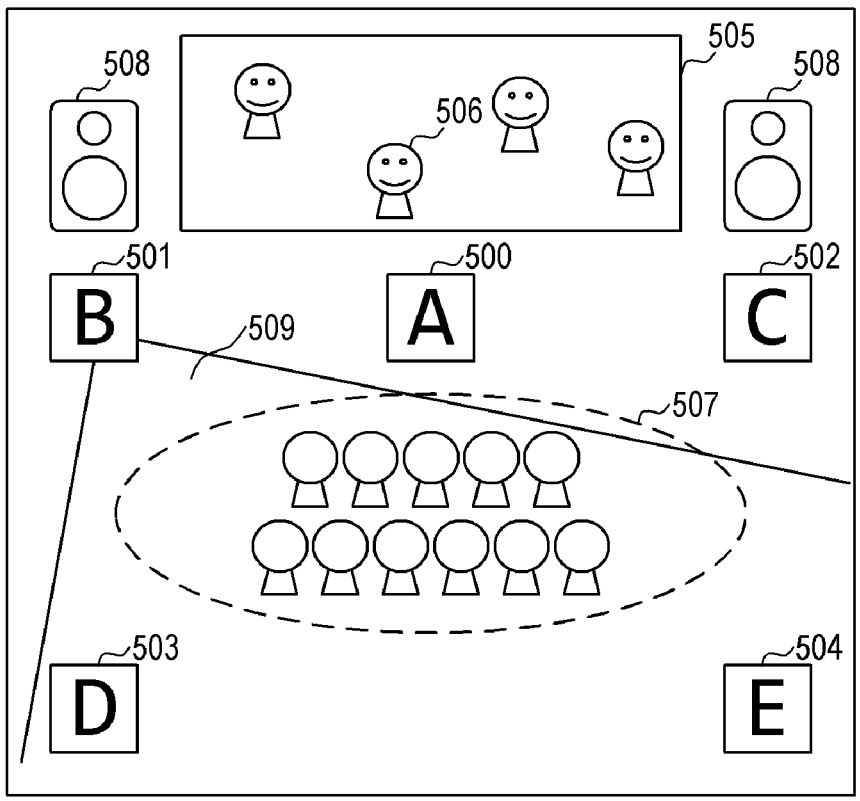
FIGS. 5A and 5B are diagrams illustrating an example of a state in which a viewer is watching a VR image.
Figure 5B:
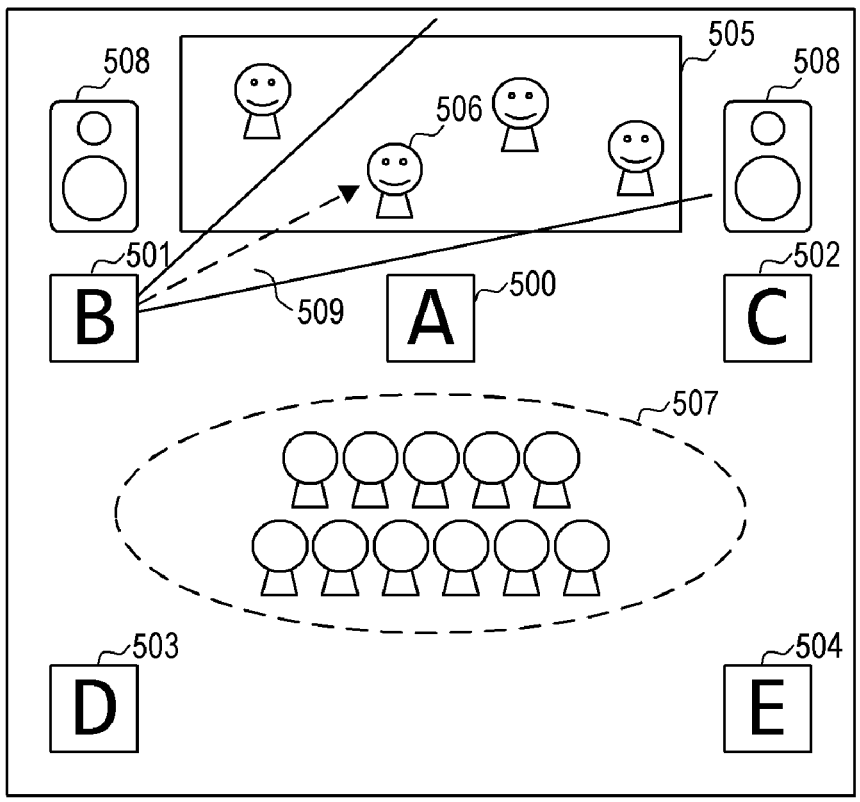

FIGS. 5A and 5B are diagrams illustrating an example of a state in which a viewer is watching a VR image. This embodiment shows one example in which VR images and audio recorded at an event site having a stage and spectators' seats are delivered to viewers via a network. A recording apparatus A 500 is an apparatus configured with the digital camera 100 so that it can both capture VR images and pick up sounds. Apparatuses similar to the recording apparatus A 500 are set at a plurality of locations in the site so that each apparatus captures VR images and picks up sounds of the surroundings. The recording apparatus A 500 is set in the upper center of FIGS. 5A and 5B (in front of a stage 505). Similarly, a recording apparatus B 501 and a recording apparatus C 502 are respectively set in the upper left and upper right in the drawing (on the left and right in front of the stage 505 as viewed from the spectators' seats). A recording apparatus D 503 and a recording apparatus E 504 are respectively set in the lower left and lower right in the drawing (on the left and right at the back of the spectators' seats). The viewer can watch and listen to the VR images and audio recorded at a desired location by selecting one of these recording apparatuses. The position information of these recording apparatuses is stored in advance in the non-volatile memory 302 of the delivery apparatus 300. XY coordinates data, for example, with the horizontal direction and vertical direction of FIGS. 5A and 5B defined as X axis and Y axis respectively, is stored in the non-volatile memory 302.

The stage 505 is a stage where a performer of this event stands. A performer 506 is a person who serves as the host of the event or a person who delivers a performance on the stage 505. An audience 507 are people who are located at positions where they can view the stage 505 and performer 506, i.e., on-site spectators of the event. A speaker 508 outputs audio associated with the performer 506 or event contents to convey the contents to the performer 506 and the audience 507. The audio output from the speaker 508 is picked up by recording apparatuses set at respective positions in the site. A viewing area 509 denotes an area of a VR image being viewed by a specific viewer (being displayed on the display control apparatus 200). In this embodiment, one example will be described in which the viewer has selected the recording apparatus B 501 as the recording apparatus that provides the viewing target. The viewer can watch an area of the VR image recorded by the recording apparatus B 501 as Viewing Area 509, which varies in accordance with the orientation of the viewer's head or entire body.

FIG. 5A is a diagram illustrating an example of a state in which the viewer is having an overall view of the VR image. The delivery apparatus 300 determines that the viewer is having an overall view of the entire audience 507 and not paying attention to a specific person or object based on the line-of-sight information detected by the line-of-sight detection unit 214 of the display control apparatus 200.

FIG. 5B is a diagram illustrating an example of a state in which the viewer is paying attention to a specific object. While FIG. 5A shows an example where the viewer is having an overall view of the audience 507, FIG. 5B shows an example of a state where the viewer is paying attention to a specific person. In FIG. 5B, while the recording apparatus B 501 is selected as with in FIG. 5A, the viewing area 509 in FIG. 5B is directed toward the stage 505 and not toward the audience 507. The delivery apparatus 300 determines based on the line-of-sight information detected by the line-of-sight detection unit 214 of the display control apparatus 200 that the viewer is watching a performer 506 in the VR image for more than a predetermined time, i.e., paying attention to the performer 506.

Delivery Process

Figure 6:
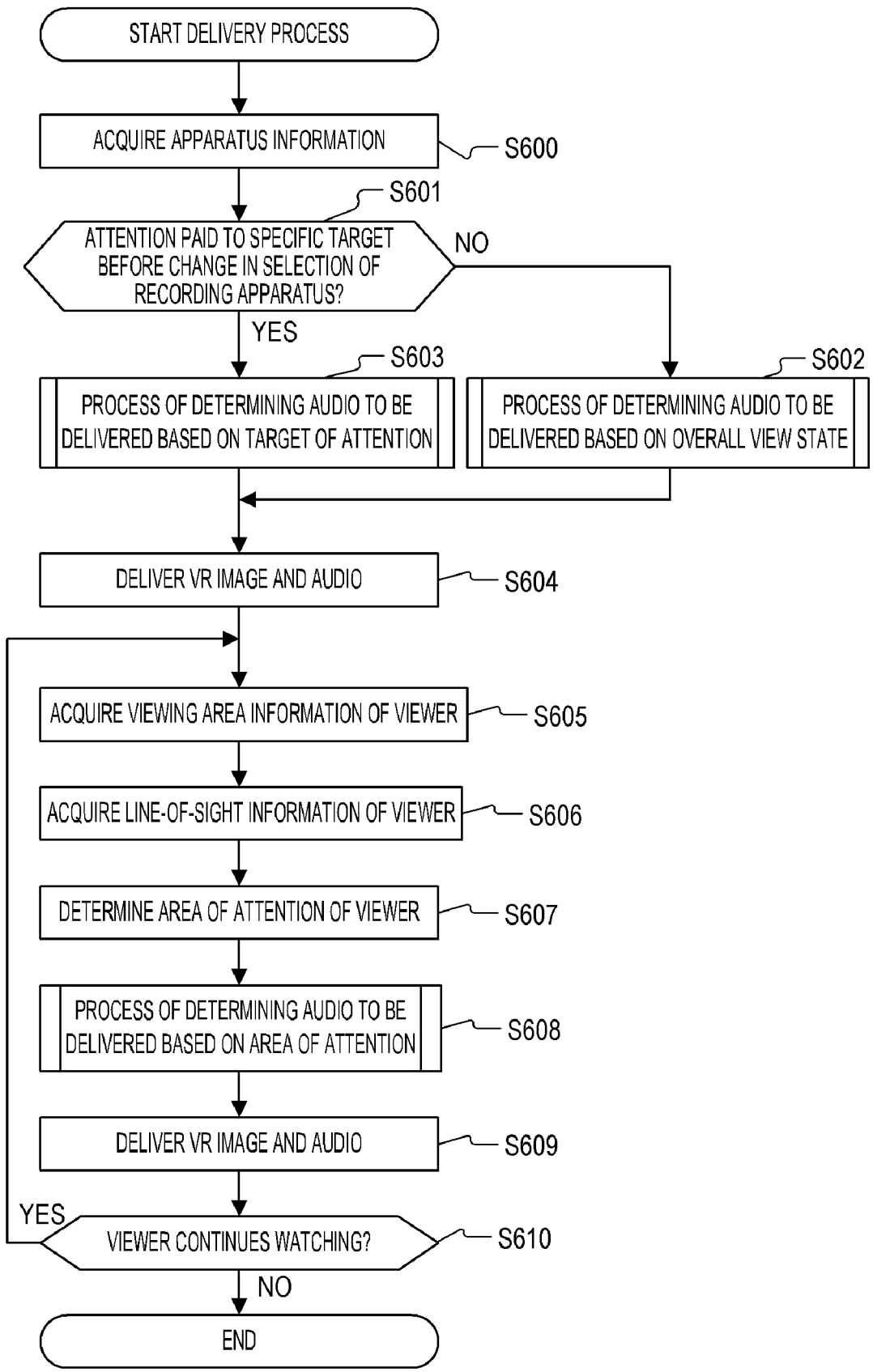
FIG. 6 is a flowchart of a delivery process.

FIG. 6 is a flowchart illustrating an example of delivery process executed by the CPU 301 of the delivery apparatus 300. At step S600, the CPU 301 acquires apparatus information relating to a recording apparatus (imaging apparatus) selected by the viewer (information on the recording apparatus that provides contents the viewer wishes to watch). At this time, the viewer can select one of the recording apparatus A 500, recording apparatus B 501, recording apparatus C 502, recording apparatus D 503, and recording apparatus E 504 as the apparatus that provides the viewing target. The CPU 301 acquires the apparatus information via a network. The process starts from step S600 every time a viewer selects a recording apparatus. At first when a viewer starts watching, the CPU may acquire preset default information as the apparatus information, or information relating to a recording apparatus selected by the viewer.

At step S601, the CPU 301 determines whether or not the state prior to a change in the selection of the recording apparatus by the viewer was a state in which the viewer was paying attention to a specific target (object). If the state prior to a change in the selection of the recording apparatus was a state in which the viewer was paying attention to a specific target, the CPU 301 proceeds to step S603, and if it was a state in which the viewer was not paying attention (overall view state), proceeds to step S602. If it is not after a change in the selection of the recording apparatus by the viewer, i.e., when the viewer has started watching, the process goes to step S602. In this embodiment, the state information regarding an attention state of the viewer is stored in the memory 303. The CPU 301 can determine whether or not the viewer was paying attention to a specific target based on the state information (information regarding the state prior to a change of recording apparatuses) stored in the memory 303.

At step S602, the CPU 301 performs the process of determining audio to be delivered based on the overall view state. At step S603, the CPU 301 performs the process of determining audio to be delivered based on a target of attention. The process steps S602 and S603 are performed by the audio generation unit 403 of the delivery apparatus 300 and will be described in more detail with reference to other flowcharts.

At step S604, the CPU 301 delivers the audio determined at step S602 or step S603 to the viewer, together with the VR image recorded by the recording apparatus selected by the viewer. Delivering a VR image and audio includes the control of reproduction (display and output) in the display control apparatus 200 that is the delivery destination. This way, when there is a change in the selection of the recording apparatus (imaging apparatus) by the viewer, the CPU 301 executes control such as to reproduce from audio that was combined in accordance with whether or not the viewer was paying attention to a specific target (object) prior to the change.

The steps from then onwards are repeated until the viewer stops watching. At step S605, the CPU 301 acquires information relating to a viewing area (viewing area information) which is an area the viewer is watching in the recorded VR image. The viewing area is based on information acquired by the orientation detection unit 213 of the display control apparatus 200. For example, the orientation detection unit 213 of the display control apparatus 200 acquires information on which direction the viewer is facing, and provides (sends) it to the delivery apparatus 300. The CPU 301 of the delivery apparatus 300 stores the received information in the memory 303.

At step S606, the CPU 301 acquires line-of-sight information of the viewer. The line-of-sight information is the information detected by the line-of-sight detection unit 214 of the display control apparatus 200, which is for example XY coordinates information corresponding to a display location on the display 205. The CPU 301 stores the line-of-sight information in the memory 303 of the delivery apparatus 300 similarly to the viewing area information.

At step S607, the CPU 301 determines an area of attention of the viewer. The area of attention is an area the viewer is paying attention to in the viewing area (area where the viewer's gaze position was detected).

At step S608, the CPU 301 performs the process of determining audio to be delivered based on the area of attention. Similarly to steps S602 and S603, the process step S608 is performed by the audio generation unit 403 of the delivery apparatus 300. This step will be described in more detail with reference to another flowchart.

At step S609, the CPU 301 delivers the audio determined at step S608 to the viewer, together with the VR image recorded by the recording apparatus selected by the viewer.

At step S610, the CPU 301 determines whether or not the viewer continues watching. If the viewer carries on watching, the CPU 301 returns to step S605 and continues the process of delivering the VR image and audio to the viewer. On the other hand, if the viewer stops watching, the CPU 301 ends the delivery process there.

Figure 7:
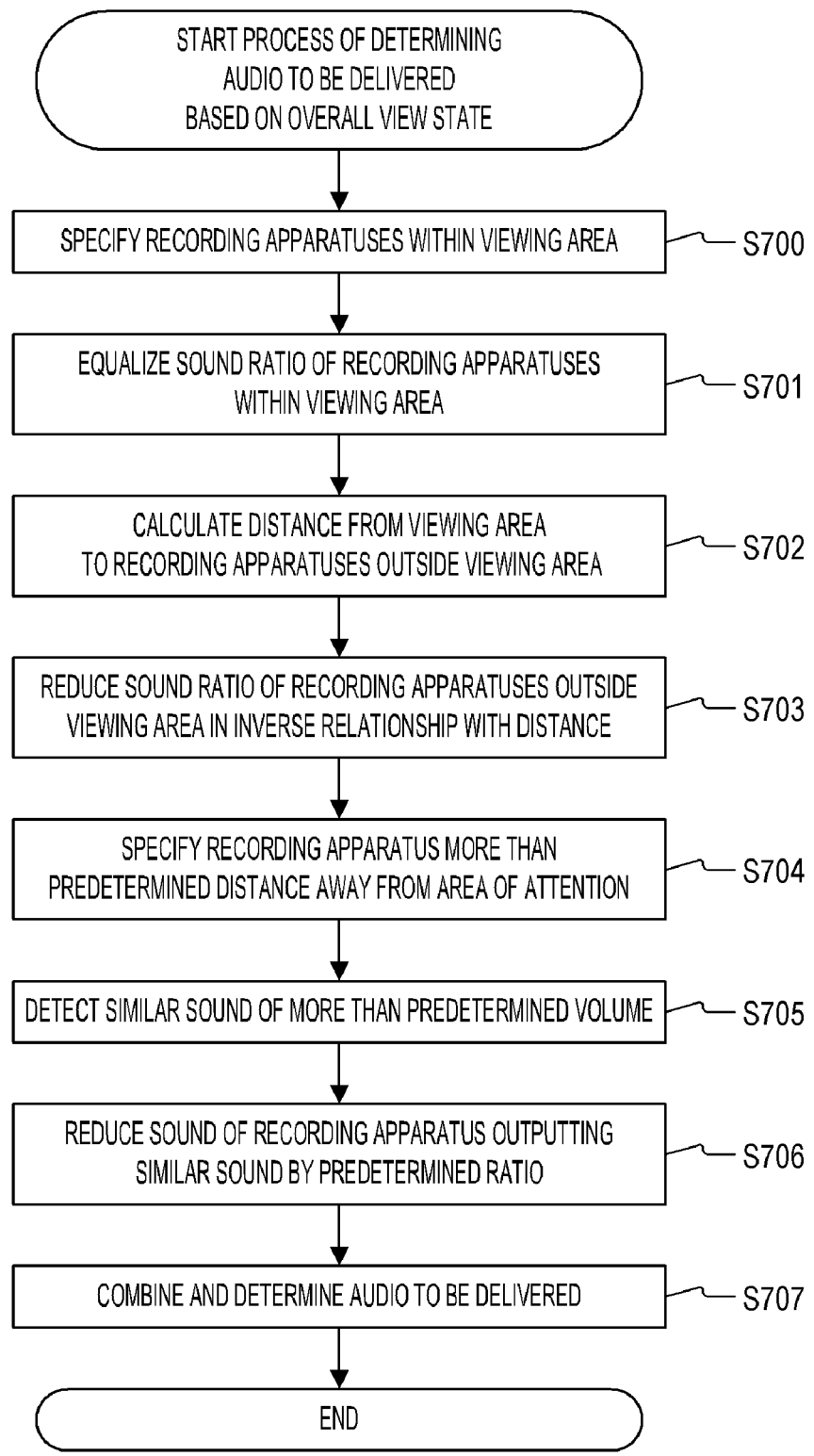
FIG. 7 is a flowchart of a process of determining audio to be delivered based on an overall view state.

The process of determining audio to be delivered based on the overall view state executed at step S602 of FIG. 6 will be described in more detail with reference to FIG. 7. FIG. 7 is a flowchart showing an example of the process of determining audio to be delivered based on the overall view state.

At step S700, the CPU 301 specifies a recording apparatus within a viewing area (recording apparatus set within an area being watched). The CPU 301 specifies a recording apparatus within a current viewing area by comparing the viewing area information stored in the memory 303 with the position information of each recording apparatus stored in advance in the non-volatile memory 302. In the case where the viewing area is kept as angle information, for example, the CPU 301 sees a fan-shaped area corresponding to the direction indicated by the angle information as the viewing area, and determines whether or not the coordinate of each recording apparatus is contained within the viewing area. Whether or not a specific point is located inside a fan-shaped area can be determined by obtaining the vector between the fan shape and the point and the orientation vector of the fan shape, and by calculating the inner product of the vectors.

At step S701, the CPU 301 equalizes the ratio of the sounds in the audio to be delivered that were picked up by the recording apparatuses present within the viewing area. The recording apparatuses present within the viewing area may include the recording apparatus selected by the viewer (recording apparatus B 501 in the example of FIG. 5A).

At step S702, the CPU 301 calculates the distance from the viewing area to recording apparatuses set outside the viewing area. The CPU 301 may calculate the distance from the center of the viewing area to each recording apparatus, or the distance from an edge of the viewing area to each recording apparatus, or a minimum distance.

At step S703, the CPU 301 reduces the ratio of the sounds in the audio to be delivered that were picked up by recording apparatuses set outside the viewing area such that the longer the distance from the viewing area to the recording apparatus, the smaller the ratio (reduces the ratio in inverse proportion to the distance).

At step S704, the CPU 301 specifies a recording apparatus set at a location a predetermined distance away from the area of attention. The distance from the area of attention to the recording apparatus may be a distance from the center of the area of attention, or the distance from an edge of the area of attention, or a minimum distance. If the viewer is in the overall view state, the area of attention may be set the same as the viewing area.

At step S705, the CPU 301 detects similar sounds of a predetermined volume or more (sounds picked up by other sound pickup apparatuses) from the sound picked up by the recording apparatus specified at step S704. Whether a sound is the same (similar) or not may be determined for example by obtaining characteristic values of the audio data such as frequency components and by calculating a similarity between the sounds from a difference in the characteristic values.

At step S706, the CPU 301 determines a predetermined smaller ratio for the level of the sound from the recording apparatus including the similar sounds detected at step S705. At step S706, the CPU 301 may lower the ratio of the sound recorded by the recording apparatus and included in the audio to be delivered so as to reduce the sound volume of this recording apparatus relative to the sound volumes of other recording apparatuses, or, may lower the sound volume itself of this recording apparatus included in the audio to be delivered. This way, even when a specific sound is picked up by a plurality of recording apparatuses, this specific sound can be prevented from being delivered with too high a volume. In the example of FIG. 5B, the audio to be delivered is generated such that the sound output from the speaker 508, for example, will not stand out too much, among the sounds picked up by the recording apparatuses B and C (501 and 502).

At step S707, the CPU 301 combines a plurality of sounds picked up by respective recording apparatuses with a ratio determined at step S701 or step S703, to determine the audio to be reproduced with the VR image. Once the audio to be delivered is determined, the CPU 301 ends the process of determining the audio to be delivered.

Figure 8:
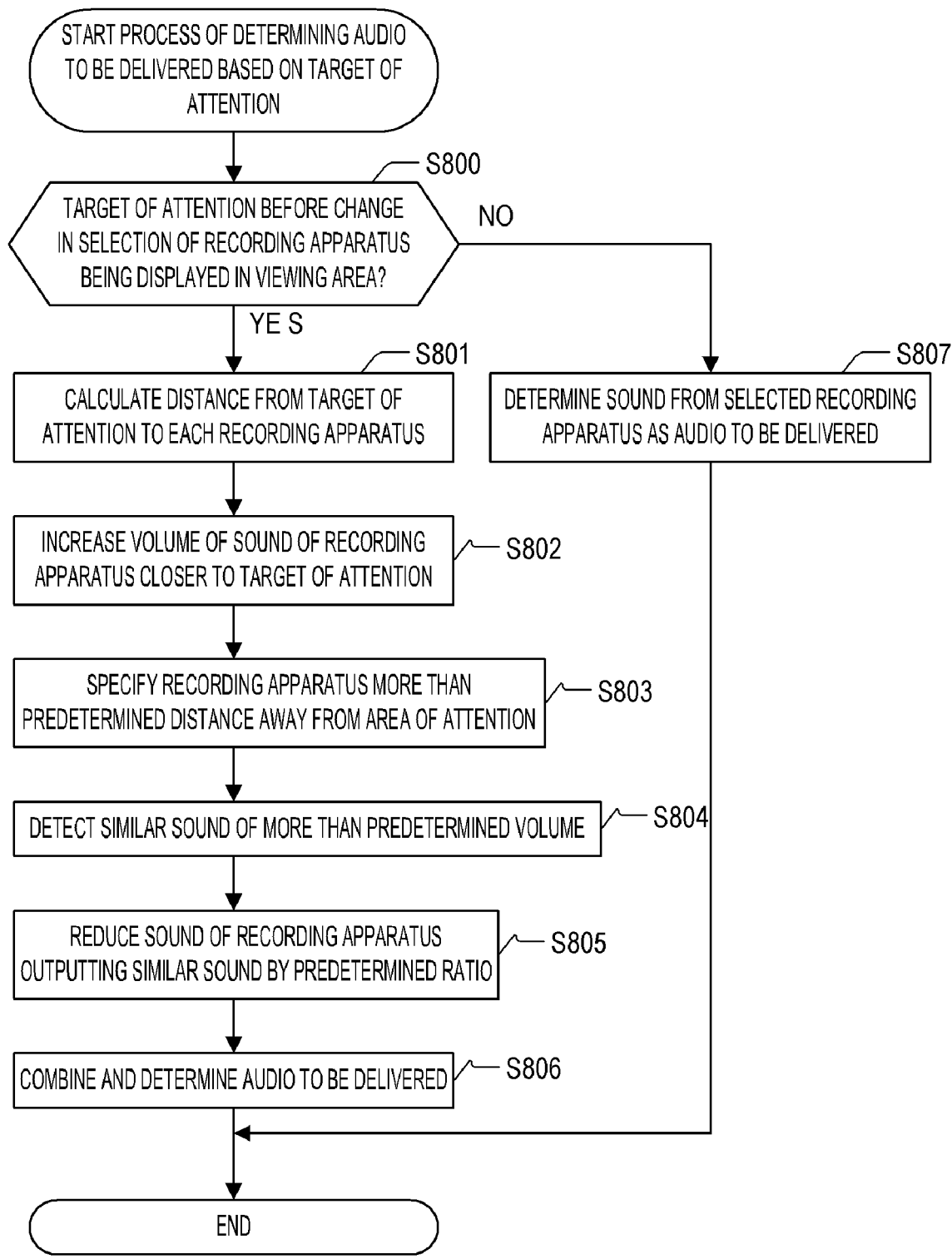
FIG. 8 is a flowchart of a process of determining audio to be delivered based on a target of attention.

The process of determining audio to be delivered based on the target of attention executed at step S603 of FIG. 6 will be described in more detail with reference to FIG. 8. FIG. 8 is a flowchart showing an example of the process of determining audio to be delivered based on the target of attention.

At step S800, the CPU 301 determines whether or not the target the viewer was paying attention to (attention target) prior to a change in the selection of the recording apparatus by the viewer is being displayed in the viewing area after the change of the recording apparatuses (current viewing area). In this embodiment, this target information indicating the specific target is stored in the memory 303 together with the state information that indicates the viewer's attention being paid to a specific target. The CPU 301 can determine the target of attention prior to the change in the selection of the recording apparatus from the target information. If the target of attention is being displayed in the viewing area, the CPU 301 proceeds to step S801, and if it is not being displayed, proceeds to step S807. Alternatively, the CPU 301 may proceed to step S801 irrespective of whether or not the target of attention is being displayed in the viewing area.

At step S801, the CPU 301 calculates the distance (for example minimum distance) from the target of attention being displayed in the viewing area to each recording apparatus. The position of the target of attention can be calculated (specified) for example based on the size of the target of attention recorded in the VR image captured by each recording apparatus. Alternatively, a sensor that allows its position to be located may be attached to a candidate for the target of attention such as a person. The above target information includes the position information of the target of attention.

At step S802, the CPU 301 raises the volume of sound that was picked up by a recording apparatus such that the shorter the distance from the target of attention to this recording apparatus, the larger the increment. At step S802, the CPU 301 may raise the ratio of the sound of the recording apparatus included in the audio to be delivered so as to increase the sound volume of this recording apparatus relative to the sound volumes of other recording apparatuses, or, may increase the sound volume itself of this recording apparatus included in the audio to be delivered. This way, the audio to be delivered is combined such that when the viewer changes the recording apparatuses from one to another and if the target of attention before the change is still being displayed after the change, the volume of the sound that was picked up by the recording apparatus close to the target of attention is increased. The audio to be delivered is combined such that the volume of the sound that was picked up by the recording apparatus close to the target of attention is increased both before and after the change of recording apparatuses, and therefore there is no sudden change in the level of audio being delivered before and after the change of recording apparatuses. In the case where the target of attention (e.g., a band vocal) is holding a dedicated microphone, the CPU 301 may combine the audio to be delivered such that the sound picked up by the dedicated microphone will be included with a high volume (e.g., highest volume).

The processing steps S803 to S806 are the same as the processing steps S704 to S707 of FIG. 7.

At step S807, the CPU 301 determines the sound picked up by the recording apparatus currently selected by the viewer as the audio to be delivered.

Figure 9:
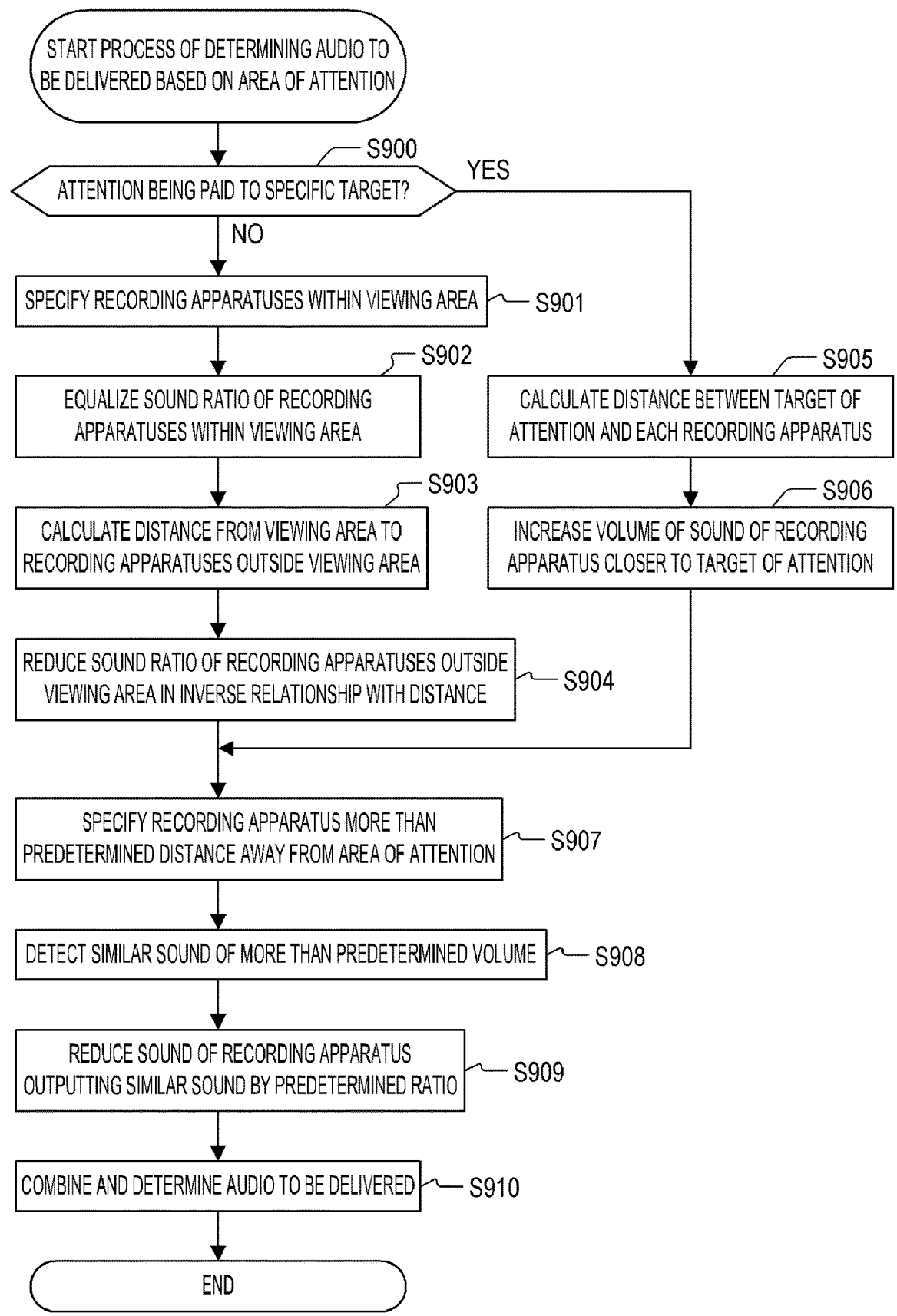
FIG. 9 is a flowchart of a process of determining audio to be delivered based on an area of attention.

The process of determining audio to be delivered based on the area of attention executed at step S608 of FIG. 6 will be described in more detail with reference to FIG. 9. FIG. 9 is a flowchart showing an example of the process of determining audio to be delivered based on the area of attention.

At step S900, the CPU 301 determines whether or not the viewer is paying attention to a specific target based on the area of attention. If the viewer is paying attention to a specific target, the CPU 301 proceeds to step S905, and if the viewer is not paying attention (the viewer is in the overall view state), proceeds to step S901. The CPU 301 may determine that it is a state in which the viewer is paying attention to a specific target if the position of the specific target in the VR image matches the gaze position (area of attention specified based on the gaze position) for more than a predetermined time. For example, the CPU 301 may recognize the face of a person in the VR image the viewer is watching, and determines that the viewer is in the state of paying attention to this person if the position of the person's face matches the gaze position for more than a predetermined time. If this condition is not met and the CPU 301 fails to determine that the viewer is paying attention to a specific target, the CPU determines that the viewer is in the overall view state in which the viewer is having an overall view of the viewing area. When this is the case, the CPU 301 stores the state information regarding the attention state of the viewer in the memory 303. In the case where the state information indicating that the viewer is paying attention to a specific target is stored in the memory 303, the CPU 301 also stores the target information indicating this specific target in the memory 303.

The processing steps S901 to S904 are the same as the processing steps S700 to S703 of FIG. 7. The processing steps S905 to S910 are the same as the processing steps S801 to S806 of FIG. 8.

When changing the ratio of the sounds included in the audio to be delivered, the CPU 301 may change the ratio to a target value instantaneously, or gradually for smooth transition of the audio.

According to the embodiment of the present invention described above, the sound being reproduced can be varied in accordance with the state of attention of the viewer watching the VR image. This provides a video viewing experience with a higher sense of presence than before, for example.

Various control processes described above that are performed by the delivery apparatus 300 may be carried out by one hardware system, or, separately by a plurality of hardware units (e.g., a plurality of processors and circuits) in a coordinated manner to achieve overall control of the apparatus. While one example in which the present invention is applied to a VR image delivery apparatus in an event site has been described in the embodiment above, the invention is not limited to this example and can be applied to any apparatus that allows viewing of VR images. The invention is not only applicable to VR images but also to an apparatus that provides viewing of panoramic images or multi-view images. The processing performed by the delivery apparatus in the description above may be executed as internal processing of the display control apparatus (such as HMD).

The present invention can provide a technique that allows a sufficient sense of presence to be imparted to viewers.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The embodiment described above is merely an example. Any configurations obtained by suitably modifying or changing some configurations of the embodiment within the scope of the subject matter of the present invention are also included in the present invention. The present invention also includes other configurations obtained by suitably combining various features of the embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-034488, filed on Mar. 7, 2022, which is hereby incorporated by reference herein in its entirety.

What is claimed is:
1. An information processing apparatus comprising:
a processor; and
a memory storing a program which, when executed by the processor, causes the information processing apparatus to:
acquire a video captured by an imaging apparatus,
acquire a plurality of sounds picked up by a plurality of sound pickup apparatuses in sync with capturing of the video,
acquire state information regarding an attention state of a viewer to the video,
generate audio to be reproduced with the video by combining the plurality of sounds, wherein, in a case where the state information indicates that the viewer is having an overall view of the video, a plurality of sounds picked up by a plurality of sound pickup apparatuses set inside an area being watched by the viewer in the video are combined with an equal ratio, and sounds picked up by sound pickup apparatuses set outside the area are combined with a ratio that is reduced as the distance from the area to the sound pickup apparatuses increases,
generate audio to be reproduced with the video by combining the plurality of sounds, wherein, in a case where the state information indicates that the viewer is paying attention to a specific object contained in the video, volumes of the sounds picked up by the sound pickup apparatuses are raised with an increment that is increased as the distance to each sound pickup apparatus from the object the viewer is paying attention to reduces, and
reduce a volume of a sound from a sound pickup apparatus, the sound including a similar sound of which a volume is higher than a predetermined level,
wherein:
the similar sound is a sound picked up by two or more sound pickup apparatuses among the plurality of sound pickup apparatuses,
the plurality of sound pickup apparatuses include a plurality of imaging apparatuses, respectively,
control is performed to reproduce a video captured by a sound pickup apparatus selected by the viewer,
when there is a change in selection of the sound pickup apparatus by the viewer, audio to be reproduced with a video after the change is generated based on the state information acquired before the change,
in a case when the state information acquired before the change of sound pickup apparatuses indicates that the viewer is paying attention to a specific object contained in the video, and the specific object is contained in the video after the change, the audio to be reproduced with the video after the change is generated to reproduce from audio obtained by combining the plurality of sounds such that volumes of the sounds picked up by the sound pickup apparatuses are raised with an increment that is increased as the distance to each sound pickup apparatus from the object the viewer is paying attention to reduces, and
in a case when the state information acquired before the change of sound pickup apparatuses indicates that the viewer is paying attention to a specific object contained in the video, and the specific object is not contained in the video after the change, the plurality of sounds is not combined and the sound picked up by the sound pickup apparatus after the change is determined as the audio to be reproduced with the video after the change.
2. The information processing apparatus according to claim 1, wherein the plurality of sounds are combined such as to reduce volumes of sounds picked up at a volume higher than a predetermined level by sound pickup apparatuses set at locations a predetermined distance away from an area the viewer is paying attention to.

3. The information processing apparatus according to claim 1, wherein the viewer is able to select one of a plurality of imaging apparatuses, and
when the program is executed by the processor, the program further causes the information processing apparatus to
acquire apparatus information relating to an imaging apparatus selected by the viewer, and
perform control to reproduce a video that was captured by the imaging apparatus selected by the viewer, based on the apparatus information.

4. The information processing apparatus according to claim 3, wherein, when there is a change in selection of the imaging apparatus by the viewer, audio to be reproduced with a video after the change is generated based on the state information that was acquired prior to the change.

5. The information processing apparatus according to claim 4, wherein, in a case where the state information acquired before the change of imaging apparatuses indicates that the viewer is having an overview of the video,
audio to be reproduced with a video after the change is generated to reproduce from audio obtained by combining the plurality of sounds such that a plurality of sounds picked up by a plurality of sound pickup apparatuses set inside an area being watched by the viewer in the video are combined with an equal ratio, and sounds picked up by sound pickup apparatuses set outside the area are combined with a ratio that is reduced as the distance from the area to the sound pickup apparatuses increases.

6. The information processing apparatus according to claim 1, wherein the state information is acquired based on a gaze position of the viewer.

7. The information processing apparatus according to claim 1, wherein,
when the program is executed by the processor, the program further causes the information processing apparatus to determine whether the state information indicates that the viewer is having an overall view of the video or that the viewer is paying attention to the specific object contained in the video,
in a case where it is determined that the state information indicates that the viewer is having an overall view of the video, the plurality of sounds picked up by the plurality of sound pickup apparatuses set inside an area being watched by the viewer in the video are combined with the equal ratio, and sounds picked up by sound pickup apparatuses set outside the area are combined with the ratio that is reduced as the distance from the area to the sound pickup apparatuses increases, and
in a case where it is determined that the state information indicates that the viewer is paying attention to the specific object contained in the video, volumes of the sounds picked up by the sound pickup apparatuses are raised with the increment that is increased as the distance to each sound pickup apparatus from the object the viewer is paying attention to reduces.

8. The information processing apparatus according to claim 1, wherein in a case where the viewer is not paying attention to any object, the state information indicates that the viewer is having an overall view of the video.

9. The information processing apparatus according to claim 1, wherein in a case where it fails to determine that the viewer is paying attention to the specific object, the state information indicates that the viewer is having an overall view of the video.

10. The information processing apparatus according to claim 1, wherein the state information indicates whether or not the viewer is having an overall view of the video.

11. The information processing apparatus according to claim 1, wherein in a case where a position of the specific object contained in the video matches a gaze position of the viewer for more than a predetermined time, the state information indicates that the viewer is paying attention to the specific object.

12. The information processing apparatus according to claim 1, wherein in a case where a position of a face of the specific object contained in the video matches a gaze position of the viewer for more than a predetermined time, the state information indicates that the viewer is paying attention to the specific object.

13. The information processing apparatus according to claim 1, wherein,
when the program is executed by the processor, the program further causes the information processing apparatus to
determine a characteristic value of a sound based on a frequency component of the sound,
determine a similarity between sounds based on a difference in characteristic values of the sounds, and
detect the similar sound based on the similarity.

14. The information processing apparatus according to claim 1, wherein, in a case where the specific object is holding a first sound pickup apparatus, in generating the audio to be reproduced with the video, among the plurality of sounds picked up by the plurality of sound pickup apparatuses, a first sound picked up by the first sound pickup apparatus is combined with a highest volume.

15. The information processing apparatus according to claim 1, wherein,
each of the sound pickup apparatuses captures a video,
control is performed to display a first video captured by a first sound pickup apparatus selected by the viewer,
when the first video is being displayed and the state information indicates that the viewer is having an overall view of the first video, even if the first sound pickup apparatus is not contained in a first area being watched by the viewer in the first video, a plurality of sounds picked up by a plurality of sound pickup apparatuses set inside the first area and a first sound picked up by the first sound pickup apparatus are combined with an equal ratio, and sounds picked up by sound pickup apparatuses which are different from the first sound pickup apparatus and are set outside the first area are combined with a ratio that is reduced as the distance from the first area to the sound pickup apparatuses increases.

16. A control method of an information processing apparatus, comprising:
acquiring a video captured by an imaging apparatus,
acquiring a plurality of sounds picked up by a plurality of sound pickup apparatuses in sync with capturing of the video,
acquiring state information regarding an attention state of a viewer to the video,
generating audio to be reproduced with the video by combining the plurality of sounds, wherein, in a case where the state information indicates that the viewer is having an overall view of the video, a plurality of sounds picked up by a plurality of sound pickup apparatuses set inside an area being watched by the viewer in the video are combined with an equal ratio, and sounds picked up by sound pickup apparatuses set outside the area are combined with a ratio that is reduced as the distance from the area to the sound pickup apparatuses increases, generating audio to be reproduced with the video by combining the plurality of sounds, wherein, in a case where the state information indicates that the viewer is paying attention to a specific object contained in the video, volumes of the sounds picked up by the sound pickup apparatuses are raised with an increment that is increased as the distance to each sound pickup apparatus from the object the viewer is paying attention to reduces, and reducing a volume of a sound from a sound pickup apparatus, the sound including a similar sound of which a volume is higher than a predetermined level, wherein:

the similar sound is a sound picked up by two or more sound pickup apparatuses among the plurality of sound pickup apparatuses, the plurality of sound pickup apparatuses include a plurality of imaging apparatuses, respectively, control is performed to reproduce a video captured by a sound pickup apparatus selected by the viewer, when there is a change in selection of the sound pickup apparatus by the viewer, audio to be reproduced with a video after the change is generated based on the state information acquired before the change, in a case when the state information acquired before the change of sound pickup apparatuses indicates that the viewer is paying attention to a specific object contained in the video, and the specific object is contained in the video after the change, the audio to be reproduced with the video after the change is generated to reproduce from audio obtained by combining the plurality of sounds such that volumes of the sounds picked up by the sound pickup apparatuses are raised with an increment that is increased as the distance to each sound pickup apparatus from the object the viewer is paying attention to reduces, and in a case when the state information acquired before the change of sound pickup apparatuses indicates that the viewer is paying attention to a specific object contained in the video, and the specific object is not contained in the video after the change, the plurality of sounds is not combined and the sound picked up by the sound pickup apparatus after the change is determined as the audio to be reproduced with the video after the change.

17. A non-transitory computer readable medium that stores a program, wherein the program causes a computer to execute a control method of an information processing apparatus, the control method comprising:

acquiring a video captured by an imaging apparatus, acquiring a plurality of sounds picked up by a plurality of sound pickup apparatuses in sync with capturing of the video, acquiring state information regarding an attention state of a viewer to the video, generating audio to be reproduced with the video by combining the plurality of sounds, wherein, in a case where the state information indicates that the viewer is having an overall view of the video, a plurality of sounds picked up by a plurality of sound pickup apparatuses set inside an area being watched by the viewer in the video are combined with an equal ratio, and sounds picked up by sound pickup apparatuses set outside the area are combined with a ratio that is reduced as the distance from the area to the sound pickup apparatuses increases, generating audio to be reproduced with the video by combining the plurality of sounds, wherein, in a case where the state information indicates that the viewer is paying attention to a specific object contained in the video, volumes of the sounds picked up by the sound pickup apparatuses are raised with an increment that is increased as the distance to each sound pickup apparatus from the object the viewer is paying attention to reduces, and reducing a volume of a sound from a sound pickup apparatus, the sound including a similar sound of which a volume is higher than a predetermined level, wherein:

the similar sound is a sound picked up by two or more sound pickup apparatuses among the plurality of sound pickup apparatuses, the plurality of sound pickup apparatuses include a plurality of imaging apparatuses, respectively, control is performed to reproduce a video captured by a sound pickup apparatus selected by the viewer, when there is a change in selection of the sound pickup apparatus by the viewer, audio to be reproduced with a video after the change is generated based on the state information acquired before the change, in a case when the state information acquired before the change of sound pickup apparatuses indicates that the viewer is paying attention to a specific object contained in the video, and the specific object is contained in the video after the change, the audio to be reproduced with the video after the change is generated to reproduce from audio obtained by combining the plurality of sounds such that volumes of the sounds picked up by the sound pickup apparatuses are raised with an increment that is increased as the distance to each sound pickup apparatus from the object the viewer is paying attention to reduces, and in a case when the state information acquired before the change of sound pickup apparatuses indicates that the viewer is paying attention to a specific object contained in the video, and the specific object is not contained in the video after the change, the plurality of sounds is not combined and the sound picked up by the sound pickup apparatus after the change is determined as the audio to be reproduced with the video after the change.

18. A system including an imaging apparatus, a plurality of sound pickup apparatuses, and an information processing apparatus, the information processing apparatus comprising:

a processor; and a memory storing a program which, when executed by the processor, causes the information processing apparatus to:

acquire a video captured by the imaging apparatus, acquire a plurality of sounds picked up by the plurality of sound pickup apparatuses in sync with capturing of the video, acquire state information regarding an attention state of a viewer to the video, generate audio to be reproduced with the video by combining the plurality of sounds, wherein, in a case where the state information indicates that the viewer is having an overall view of the video, a plurality of sounds picked up by a plurality of sound pickup apparatuses set inside an area being watched by the viewer in the video are combined with an equal ratio, and sounds picked up by sound pickup apparatuses set outside the area are combined with a ratio that is reduced as the distance from the area to the sound pickup apparatuses increases, generate audio to be reproduced with the video by combining the plurality of sounds, wherein, in a case where the state information indicates that the viewer is paying attention to a specific object contained in the video, volumes of the sounds picked up by the sound pickup apparatuses are raised with an increment that is increased as the distance to each sound pickup apparatus from the object the viewer is paying attention to reduces, and reduce a volume of a sound from a sound pickup apparatus, the sound including a similar sound of which a volume is higher than a predetermined level, wherein:

the similar sound is a sound picked up by two or more sound pickup apparatuses among the plurality of sound pickup apparatuses, the plurality of sound pickup apparatuses include a plurality of imaging apparatuses, respectively, control is performed to reproduce a video captured by a sound pickup apparatus selected by the viewer, when there is a change in selection of the sound pickup apparatus by the viewer, audio to be reproduced with a video after the change is generated based on the state information acquired before the change, in a case when the state information acquired before the change of sound pickup apparatuses indicates that the viewer is paying attention to a specific object contained in the video, and the specific object is contained in the video after the change, the audio to be reproduced with the video after the change is generated to reproduce from audio obtained by combining the plurality of sounds such that volumes of the sounds picked up by the sound pickup apparatuses are raised with an increment that is increased as the distance to each sound pickup apparatus from the object the viewer is paying attention to reduces, and in a case when the state information acquired before the change of sound pickup apparatuses indicates that the viewer is paying attention to a specific object contained in the video, and the specific object is not contained in the video after the change, the plurality of sounds is not combined and the sound picked up by the sound pickup apparatus after the change is determined as the audio to be reproduced with the video after the change.

\* \* \* \* \*